*(12)* United States Patent
Lenzen, Jr. et al.

(10) Patent No.: US 6,189,902 B1
(45) Date of Patent: Feb. 20, 2001

(54) LIMITED ACCESS FOUR-WHEEL-DRIVE RACK & PINION MOUNTING SYSTEM

(75) Inventors: Richard A. Lenzen, Jr., White Lake Township; Eric B. Blackburn, Royal Oak; John F. Santori, Shelby Township, all of MI (US)

(73) Assignee: DaimlerChrysler Corporation, Auburn Hills, MI (US)

( * ) Notice: Under 35 U.S.C. 154(b), the term of this patent shall be extended for 0 days.

(21) Appl. No.: 09/395,099

(22) Filed: Sep. 13, 1999

(51) Int. Cl.[7] ....................................................... B62D 3/12
(52) U.S. Cl. ....................................................... 280/93.515
(58) Field of Search ........................... 280/93.514, 93.515

(56) References Cited

U.S. PATENT DOCUMENTS

| | | |
|---|---|---|
| 1,414,737 | 5/1922 | Gulick . |
| 1,778,197 | 10/1930 | Lord . |
| 2,371,835 | 3/1945 | McNamara, Jr. . |
| 3,801,125 | 4/1974 | Gotzenberger et al. . |
| 3,869,139 | 3/1975 | Gage . |
| 3,958,462 * | 5/1976 | Matschinsky et al. ......... 280/93.515 |
| 4,028,957 * | 6/1977 | Wright ............................. 280/93.515 |
| 4,314,710 * | 2/1982 | Kamoshita et al. ............. 280/93.515 |
| 5,183,286 | 2/1993 | Ayabe . |
| 5,899,498 | 5/1999 | Horton . |
| 6,102,416 * | 8/2000 | Hardrader et al. .............. 280/93.515 |

* cited by examiner

Primary Examiner—Kenneth R. Rice
(74) Attorney, Agent, or Firm—Roland A. Fuller, III

(57) ABSTRACT

A mounting system for a vehicle steering system is provided. The mounting system includes a bushing, an isolator and a fastener. The bushing includes a retaining flange and a threaded internal cavity. The isolator includes a hollow body portion and a first end wall. The isolator is installed to a steering gear assembly such that the inner surface of the end wall contacts one surface of the steering gear housing. The bushing is installed through the isolator such that the retaining flange contacts an outer surface of one of the end walls. The steering gear assembly is positioned against a vehicle chassis such that the exterior surface of the other end wall contacts a structural member. The fastener is installed through the structural member and threadably engages the internally threaded cavity. The bushing limits the amount of clamping force transmitted to the end walls and permits the isolator to effectively dampen noise and vibration.

18 Claims, 3 Drawing Sheets

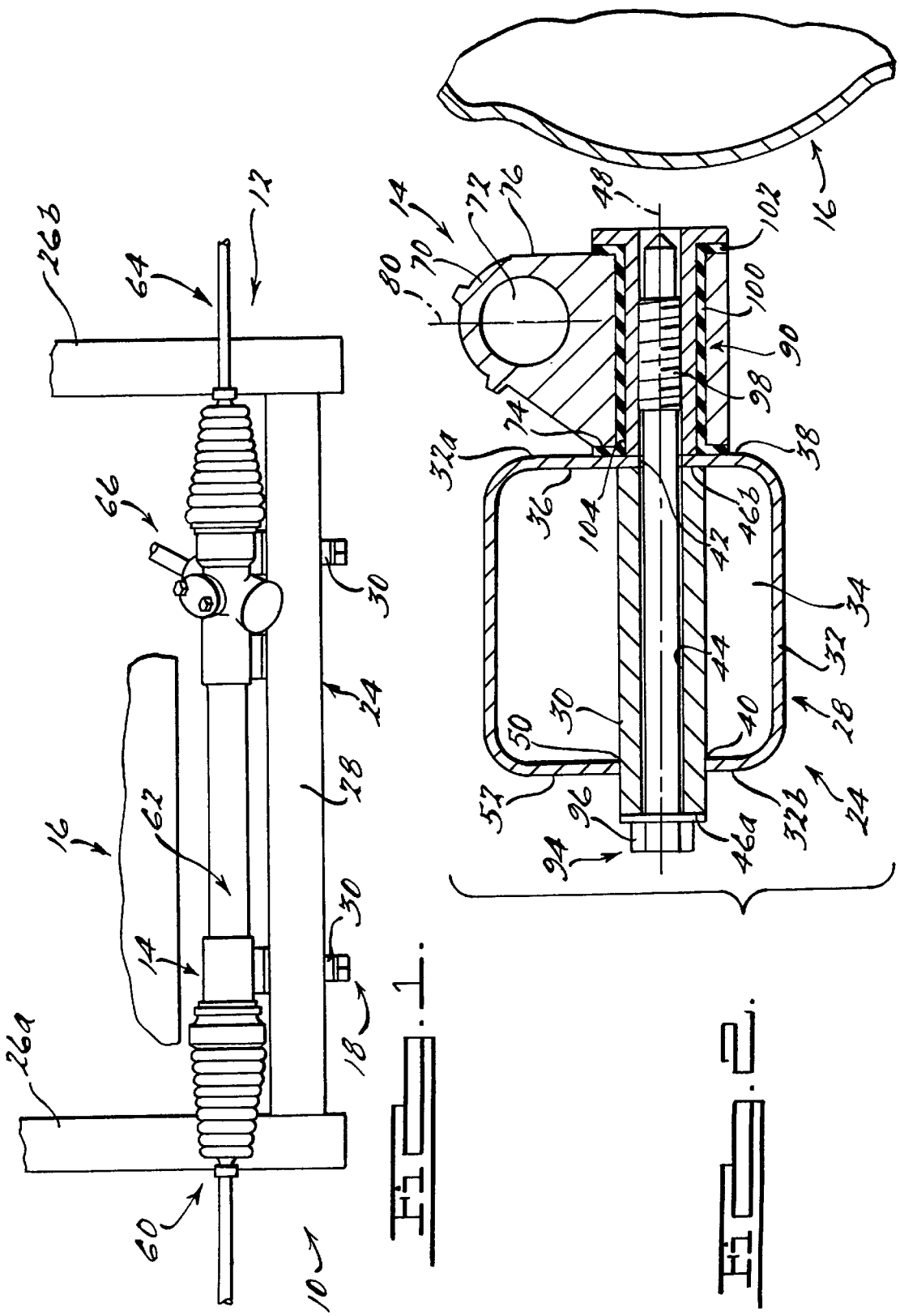

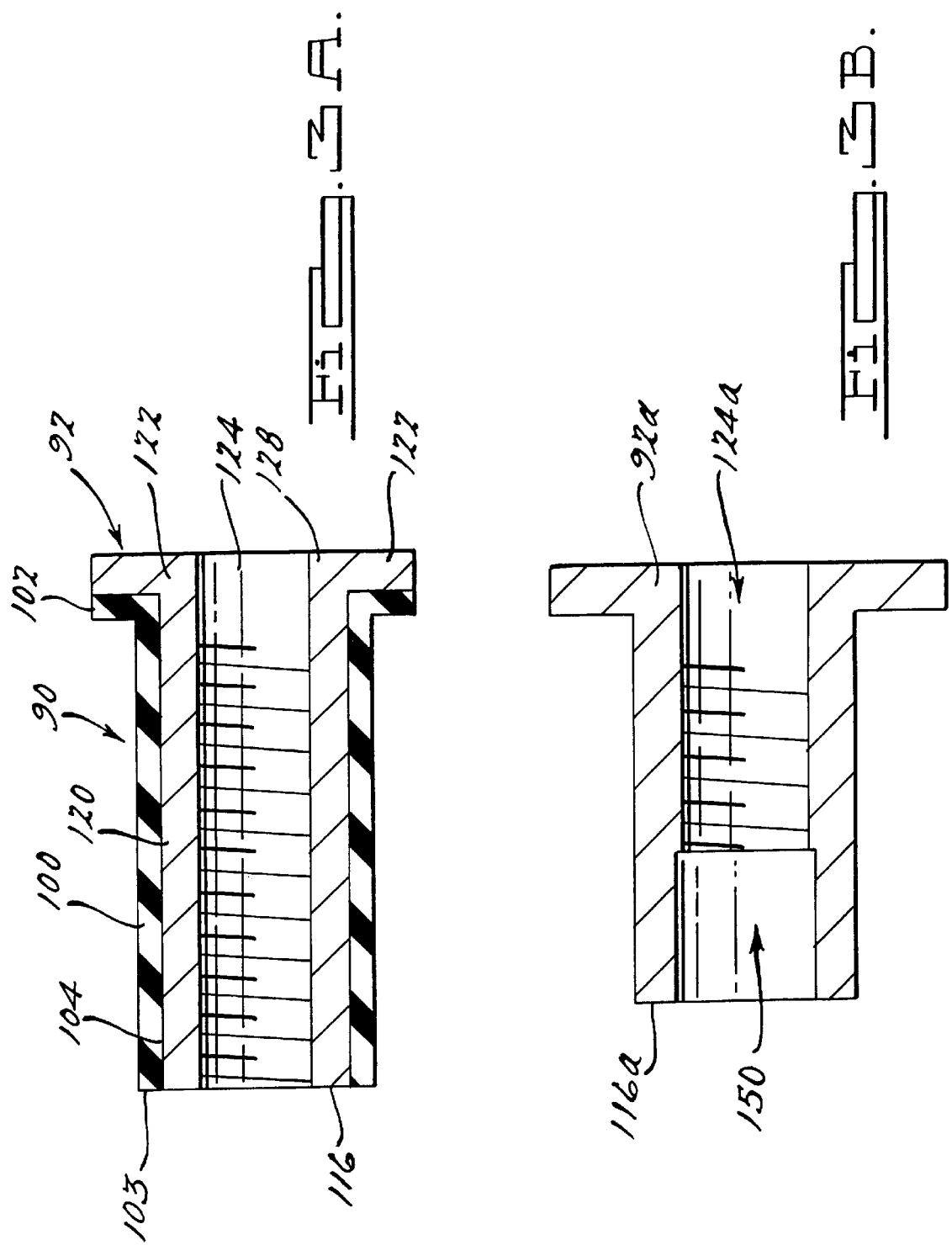

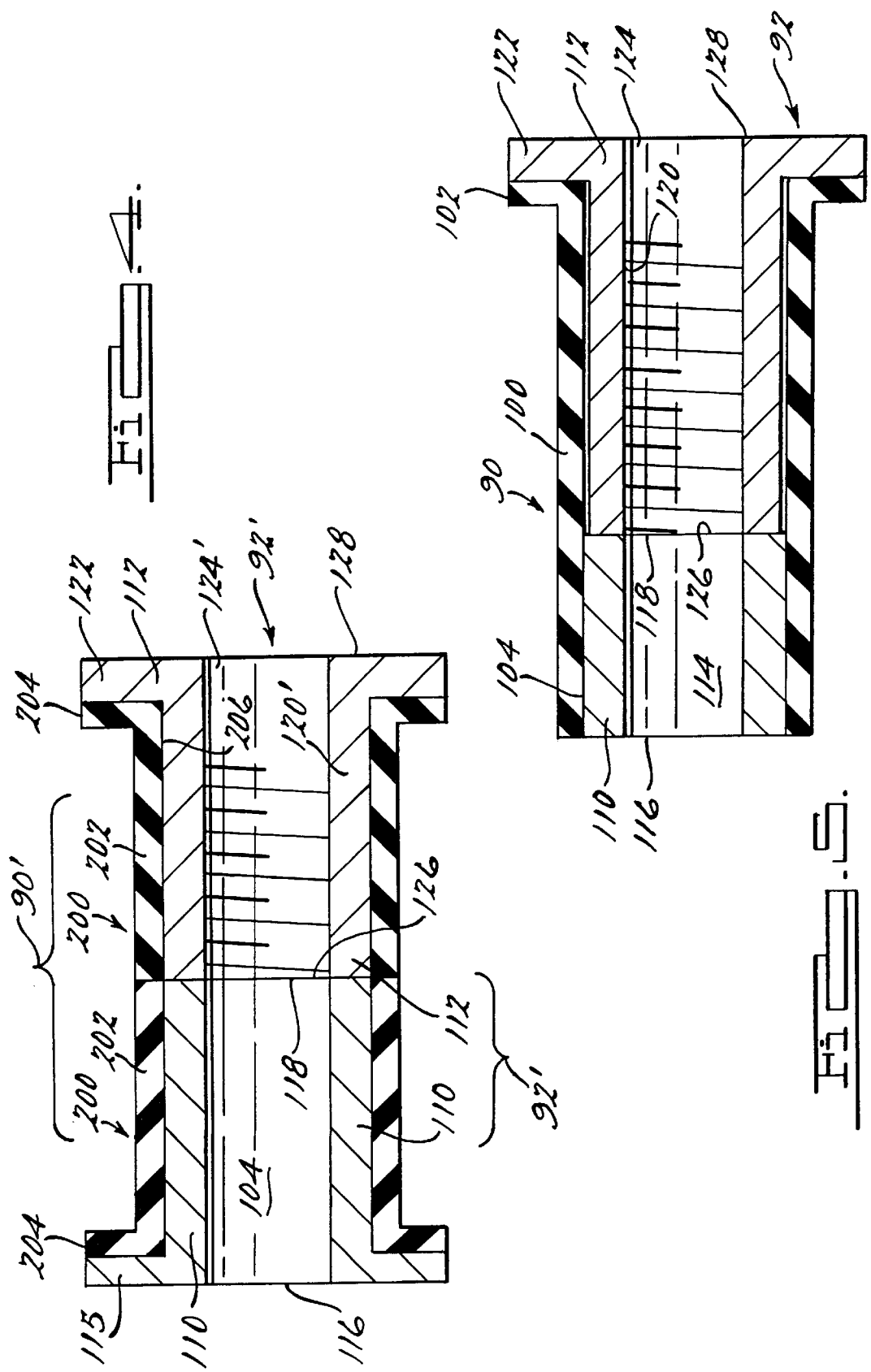

LIMITED ACCESS FOUR-WHEEL-DRIVE RACK & PINION MOUNTING SYSTEM

BACKGROUND OF THE INVENTION

1. Technical Field

The present invention relates generally to vibration isolating mounting systems and more particularly, to a vibration isolating mounting system for a rack and pinion steering gear. More specifically, but without restriction to the particular embodiment and/or use which is shown and described for purposes of illustration, the present invention relates to a vibration isolating mounting system for rack and pinion steering gear which provides increased clearance between the front axle assembly of a four-wheel drive vehicle and the steering gear mounting system.

2. Discussion

It is essential in automotive designs that vehicle components which produce vibration and noise be effectively isolated from the passenger compartment and vehicle steering system. Steering gear assemblies are commonly subject to vibrations emanating from road conditions wherein shocks and vibrations emanating from the steerable road wheels of the vehicle are transmitted to the steering gear assembly through the steering linkage.

Various mounting systems for steering gear assemblies have been developed to inhibit the transmission of vibration into the vehicle steering gear assembly. These systems, however, tend to be cumbersome to assemble due to their typical use of numerous washers and retaining nuts. These systems also typically require substantial room for the installation and servicing of the steering gear assembly. This latter drawback is of particular significance when the component "packaging" space of a vehicle is limited, as is typically the case with a four-wheel drive vehicles where the vehicle front axle consumes a large portion of this packaging space.

Consequently, there remains a need in the art for a mounting system for a vehicle steering gear assembly having a reduced the number of components which permits the steering gear assembly to be easily installed and serviced and which consumes less packaging space.

SUMMARY OF THE INVENTION

It is one object of the present invention to provide a mounting system for a vehicle steering system which is more compact in design.

It is another object of the present invention to provide a mounting system for a vehicle steering system which permits the steering gear assembly to be easily removed and installed.

It is yet another object of the present invention to provide a mounting system for a vehicle steering system which utilizes a reduced number of components.

A mounting system for a vehicle steering system is provided. The mounting system includes a bushing, an isolator and a fastener. The bushing includes a retaining flange and a threaded internal cavity. The isolator includes a hollow body portion and a first end wall. The isolator is installed to a steering gear assembly such that the inner surface of the end wall contacts one surface of the steering gear housing. The bushing is installed through the isolator such that the retaining flange contacts an outer surface of one of the end walls. The steering gear assembly is positioned against a vehicle chassis such that the exterior surface of the other end wall contacts a structural member. The fastener is installed through the structural member and threadably engages the internally threaded cavity. The bushing limits the amount of clamping force transmitted to the end walls and permits the isolator to effectively dampen noise and vibration.

Additional advantages and features of the present invention will become apparent from the subsequent description and the appended claims, taken in conjunction with the accompanying drawings.

BRIEF DESCRIPTION OF THE DRAWINGS

FIG. 1 is a top view of a portion of a vehicle constructed in accordance with the teachings of a preferred embodiment of the present invention;

FIG. 2 is cross-sectional view taken along the line 2—2 of FIG. 1;

FIG. 3A is a cross-sectional view of a bushing constructed in accordance with a first preferred embodiment of the present invention;

FIG. 3B is a cross-sectional view of a bushing constructed in accordance with a second preferred embodiment of the present invention; and FIGS. 4 and 5 are a cross-sectional view of a portion of the mounting system of the present invention constructed in accordance with the teachings of another preferred embodiment.

DETAILED DESCRIPTION OF THE PREFERRED EMBODIMENT

With reference to FIGS. 1 and 2 of the drawings, a vehicle constructed in accordance with the teachings of the present invention is generally indicated by reference numeral 10. Vehicle 10 is shown to include a chassis 12, a steering gear assembly 14, a conventional front axle 16 and a steering gear mounting system 18. Chassis 12 includes a forward cross-member structure 24 which is generally perpendicular to the longitudinal axis of vehicle 10 and is fixedly coupled on opposite sides 26a, 26b to first and second lateral chassis members 26a and 26b.

Forward cross-member structure 24 is shown to have a body member 28 and a plurality of crush tubes 30. Body member 28 extends laterally to vehicle 10 and is formed from a hollow tubular material, providing body member 28 with a plurality of walls 32 which define a hollow interior cavity 34. The rear wall 32a of body member 28 is preferably constructed such that its interior and exterior surfaces 36 and 38, respectively, are flat. A plurality of first apertures 40 are included in the forward wall 32b of body member 28 and a plurality of second apertures 42 are included in rear wall 32a. As shown, each of the first apertures 40 is larger in diameter than each of the second apertures 42.

Each crush tube 30 is constructed from a heavy-walled tubular material having a hollow interior 44. Preferably, each of the ends 46a, 46b of crush tube 30 are flat and perpendicular to the axis 48 of hollow interior 44. Crush tubes 30 are inserted into each of the first apertures 40 and positioned such that end 46a contacts interior surface 36. Crush tubes 30 are then secured in place through a conventional fastening or joining process. In the particular example illustrated, crush tubes 30 are secured to body member 28 through a bead of weld 50 which joins the circumference of crush tube 30 to the exterior surface 52 of forward wall 32b.

Steering gear assembly 14 is illustrated as a rack and pinion steering gear assembly 60 having a housing assembly 62, a rack assembly 64 and a pinion assembly 66. Rack assembly 64 and pinion assembly 66 are conventional in construction and need not be discussed in detail. Housing assembly 62 includes a housing member 70 having a rack bore 72, a forward housing surface 74, a rear housing surface 76 and a plurality of mounting apertures 78. Rack bore 72 extends through the length of housing member 70. Forward and rearward housing surfaces 74 and 76 are flat and generally parallel to the axis 80 of rack bore 72. Mounting apertures 78 extend through housing member 70, preferably intersecting forward and rearward housing surfaces 74 and 76 at right angles.

As shown, mounting system 18 preferably includes an isolator 90, a bushing 92 and a conventional threaded fastener 94 having a head 96 and an externally threaded portion 90. With additional reference to FIG. 3A, isolator 90 is preferably unitarily formed from a resilient elastomeric material. Isolator 90 includes a body portion 100 and an end wall 102 which collectively define a structure having a hollow interior 104. Body portion 100 is sized to fit within the mounting apertures 78 and contact housing member 70. The length of body portion 100 is approximately equal to the distance between the forward and rearward housing surfaces 74 and 76 as measured at one of the mounting apertures 78. In the particular embodiment illustrated, body portion 100 is shaped as a hollow cylinder. End wall 102 is coupled to a distal end of body portion 100 and extends radially outwardly therefrom.

Bushing 92 is unitarily constructed and shown to include a bushing body portion 120 and a retaining flange portion 122 which collectively define a structure having a threaded cavity 124. Bushing body portion 120 includes first and second end surfaces 116 and 128, respectively, which are preferably perpendicular to the axis of threaded interior cavity 124. Retaining flange portion 122 is coupled to bushing body portion 120 at second end surface 128 and extends radially outward therefrom. Preferably, bushing 92 is fabricated from a heat treated steel material having properties which are commonly associated with grade 10.9 fasteners.

An alternative construction of the bushing member is shown in FIG. 3B. Bushing 92a is identical to bushing 92 except that threaded cavity 124a includes a counter-bore 150 proximate first end surface 116a. Counter-bore 150 is operable for distributing clamping forces in a manner so as to reduce maximum stress concentrations within bushing 92a.

Isolators 90 are initially installed into each of the mounting apertures 78 in housing member 70. Bushings 92 are subsequently installed into each of the isolators 90 such that first end surface 116 is nearest the forward housing surface 74 and second end surface 128 is nearest the rear housing surface 76. Steering gear assembly 14 is then placed between forward cross-member structure 24 and front axle 16. Fasteners 94 are inserted into each of the crush tubes 30 and threadably engaged into the threaded interior cavity 124 of bushing 92.

Tightening of fasteners 94 exerts a clamping force on forward cross-member structure 24 and steering gear assembly 14 which tends to draw the various components of these assemblies and mounting system 18 together in a predetermined manner. For example, crush tubes 30 permit relatively high clamping forces to be transmitted through cross-member structure 24 without causing the rear and forward walls 32a and 32b of body member 28 to crush inward into hollow interior cavity 34. Bushing 92 is operable for regulating the magnitude of the clamping force which is transmitted through isolator 90 into steering gear assembly 14. Specifically, bushing 92 limits the deformation of end wall 102 and the distal end 103 of isolator 90 to permit isolator 90 to effectively dampen noise and vibration.

While the mounting system of the present invention has been described thus far as having a unitarily constructed isolator and a two-piece bushing, those skilled in the art will appreciate that the invention, in its broader aspects, may be constructed somewhat differently. For example, as shown in FIG. 4, isolator 90' may be formed from two isolator members 200. Each isolator member 200 is shown to include a body 202 and an end wall 204 which collectively define a structure having a hollow interior 206'. The length of body 202 is approximately less than one half of the distance between the forward and rearward housing surfaces 74 and 76 as measured at one of the mounting apertures 78. In operation, isolator members 200 are installed into each side of the mounting apertures 78 and bushing 92 is installed therethrough. Although the isolator members 200 disposed within a particular mounting aperture 78 are not in physical contact, the bodies 202 of these isolator members 200 collectively form a body portion 100' having all of the intended functionality of body portion 100. Construction of isolator 90' in this manner provides the mounting system 18' with increased level of tolerance to component stack-up (e.g., variations in the length of the bushing 92 or in the width of the housing member 70).

As another example, the bushing may be formed from multiple members as also shown in FIG. 4. Bushing 92' is shown to include a sleeve member 110 and a bushing member 112. Sleeve member 110 is formed from a tubular material and includes a hollow interior cavity 114 and a retaining flange 115. The first and second end surfaces 116' and 118 of sleeve member 110 are preferably perpendicular to cavity 114. Retaining flange 115 extends radially outward from first end surface 1161. Sleeve member is sized to fit within the hollow interior 104 of isolator 90'. Preferably, sleeve member 110 is fabricated from a steel material.

Bushing member 112 is shown to include a bushing body portion 120' and a retaining flange portion 122 which collectively define a structure having a threaded cavity 124'. Bushing body portion 120' includes first and second end surfaces 126 and 128, respectively, which are preferably perpendicular to the axis of threaded interior cavity 124'. Retaining flange portion 122 is coupled to bushing body portion 120' at second end surface 128. Retaining flange portion 122 extends radially outwardly of bushing body portion 120'. Preferably, bushing member 112 is fabricated from a heat treated steel material having properties which are commonly associated with grade 10.9 fasteners.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A mounting system for coupling a first member to a second member, the first member having first and second laterally extending surfaces and a mounting aperture extending therethrough, the second member having first and second mounting surfaces and a mounting aperture extending therethrough, the mounting system comprising:

an isolator formed from at least one resilient member and adapted to be inserted through said mounting aperture in said first member, said isolator including a body portion and a first end wall member, said body portion having a length approximately equal to the distance across said mounting aperture in said first member, said body portion including a bushing aperture, said first end wall member coupled to a first end of said body portion, said first end wall member extending radially outward of said body portion and sized to abut one of said first and second laterally extending surfaces;

a bushing having an insert portion and a retaining flange, said insert portion sized to fit within said bushing aperture, said insert portion including a internally threaded fastener aperture, said retaining flange coupled to an end of said insert portion and extending radially outward therefrom such that said retaining flange is larger than said mounting aperture in said first member, said retaining flange contacting said first end wall member opposite said first laterally extending surface, said insert portion including an end surface spaced apart from said retaining flange and adapted to abut said second mounting surface; and a fastener having a threaded portion operably engaging said fastener aperture and producing a clamping force adapted to draw said first and second members together;

wherein said end surface is adapted to limit the portion of said clamping force that is transmitted through said isolator.

2. The mounting system of claim 1, wherein said isolator is unitarily formed from an elastomeric material.

3. The mounting system of claim 1, wherein said isolator includes a second end wall member coupled to said body portion and spaced axially apart from said first end wall member.

4. The mounting system of claim 1, wherein said bushing is unitarily formed.

5. The mounting system of claim 4, wherein said fastener aperture includes a counter-bore extending through said end surface, said counter-bore having a diameter larger than the major diameter of said internal threads.

6. The mounting system of claim 1, wherein said bushing includes a bushing member and a tubular sleeve member, the bushing member having a first abutting surface opposite said retaining flange, said sleeve member having a second abutting surface opposite said end surface, said bushing member and said sleeve member contacting one another such that said first and second abutting surfaces abut one another.

7. A rack and pinion steering gear for a vehicle having a cross-member support, said cross-member support including first and second mounting surfaces and a mounting aperture formed therethrough, said rack and pinion steering gear comprising:

a housing having first and second laterally extending surfaces;

a laterally displaceable rack disposed at least partially within said housing; and a mounting system having an isolator, a bushing and a fastener, said isolator formed from at least one resilient member and adapted to be inserted through said mounting aperture in said first member, said isolator including a body portion and a first end wall member, said body portion having a length approximately equal to the distance across said mounting aperture in said first member, said body portion including a bushing aperture, said first end wall member coupled to a first end of said body portion, first end wall member extending radially outward of said body portion and sized to abut one of said first and second laterally extending surfaces, said bushing having an insert portion and a retaining flange, said insert portion sized to fit within said bushing aperture, said insert portion including a internally threaded fastener aperture, said retaining flange coupled to an end of said insert portion and extending radially outward therefrom such that said retaining flange is larger than said mounting aperture in said first member, said retaining flange contacting said first end wall opposite said first laterally extending surface, said insert portion including an end surface spaced apart from said retaining flange and adapted to abut said second mounting surface and said fastener having a threaded portion operably engaging said fastener aperture and producing a clamping force adapted to draw said first and second members together;

wherein said end surface is adapted to limit the portion of said clamping force that is transmitted through said isolator.

8. The rack and pinion steering gear of claim 7, wherein said isolator is unitarily formed from an elastomeric material.

9. The rack and pinion steering gear of claim 7, wherein said isolator includes a second end wall member coupled to said body portion and spaced axially apart from said first end wall member.

10. The rack and pinion steering gear of claim 7, wherein said bushing is unitarily formed.

11. The rack and pinion steering gear of claim 10, wherein said fastener aperture includes a counter-bore extending through said end surface, said counter-bore having a diameter larger than the major diameter of said internal threads.

12. The rack and pinion steering gear of claim 7, wherein said bushing includes a bushing member and a tubular sleeve member, the bushing member having a first abutting surface opposite said retaining flange, said sleeve member having a second abutting surface opposite said end surface, said bushing member and said sleeve member contacting one another such that said first and second abutting surfaces abut one another.

13. A vehicle comprising:

a vehicle chassis having a cross-member structure having a rear cross-member mounting surface and a plurality of first mounting apertures, said plurality of first mounting apertures extending through said rear cross-member mounting surface;

a rack and pinion steering gear assembly having a housing, said housing including first and second housing mounting surfaces and a plurality of second mounting apertures, said second housing mounting surface spaced apart from said first housing mounting surface, said second mounting apertures extending through said first and second housing mounting surfaces; and a mounting system having an isolator, a bushing and a fastener, said isolator formed from at least one resilient member and adapted to be inserted through said mounting aperture in said first member, said isolator including a body portion a first end wall member, said body portion having a length approximately equal to the distance across said mounting aperture in said first member, said body portion including a bushing aperture, said first end wall member coupled to a first end of said body portion, said first end wall extending radially outward of said body portion and sized to abut one of said first and second laterally extending surfaces, said bushing having an insert portion and a retaining flange, said insert portion sized to fit within said bushing aperture, said insert portion including a internally threaded fastener aperture, said retaining flange coupled to an end of said insert portion and extending radially outward therefrom such that said retaining flange is larger than said mounting aperture in said first member, said retaining flange contacting said first end wall opposite said first laterally extending surface, said insert portion including an end surface spaced apart from said retaining flange and adapted to abut said second mounting surface and said fastener having a threaded portion operably engaging said fastener aperture and producing a clamping force adapted to draw said first and second members together;

wherein said end surface is adapted to limit the portion of said clamping force that is transmitted through said isolator.

14. The vehicle of claim 13, wherein said isolator is unitarily formed from an elastomeric material.

15. The vehicle of claim 13, wherein said isolator includes a second end wall member coupled to said body portion and spaced axially apart from said first end wall member.

16. The vehicle of claim 13, wherein said bushing is unitarily formed.

17. The vehicle of claim 13, wherein said fastener aperture includes a counter-bore extending through said end surface, said counter-bore having a diameter larger than the major diameter of said internal threads.

18. The vehicle of claim 13, wherein said bushing includes a bushing member and a tubular sleeve member, the bushing member having a first abutting surface opposite said retaining flange, said sleeve member having a second abutting surface opposite said end surface, said bushing member and said sleeve member contacting one another such that said first and second abutting surfaces abut one another.

* * * * *